WILSON AGER.
GRAIN-CLEANER
REISSUED JUL 4 1871
4452
Fig: I
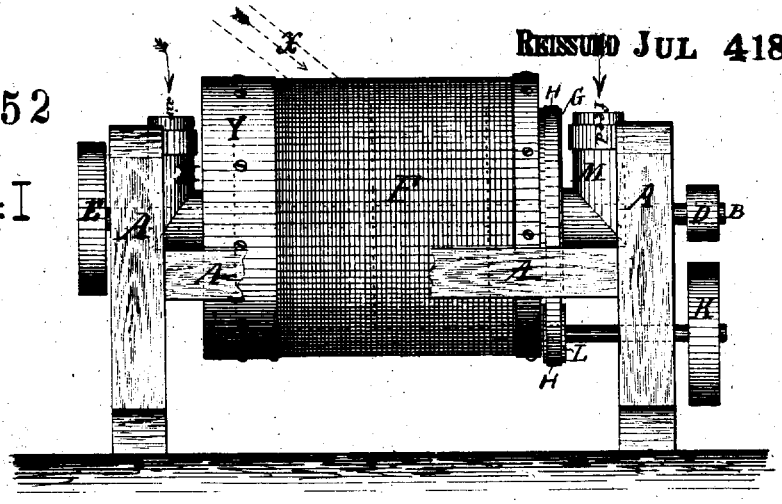
Fig II
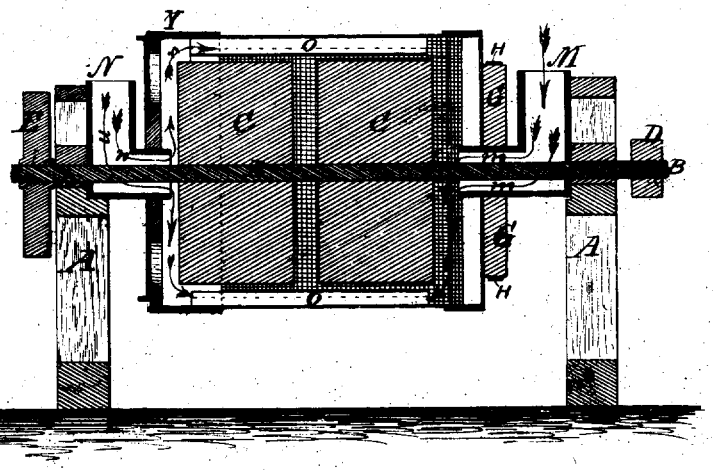
Attest
R. M. Acom
Daniel Brew
Inventor
Wilson Ager

WILSON AGER.
GRAIN-CLEANER.
No. 4,452. Reissued July. 4, 1871.
Fig IV
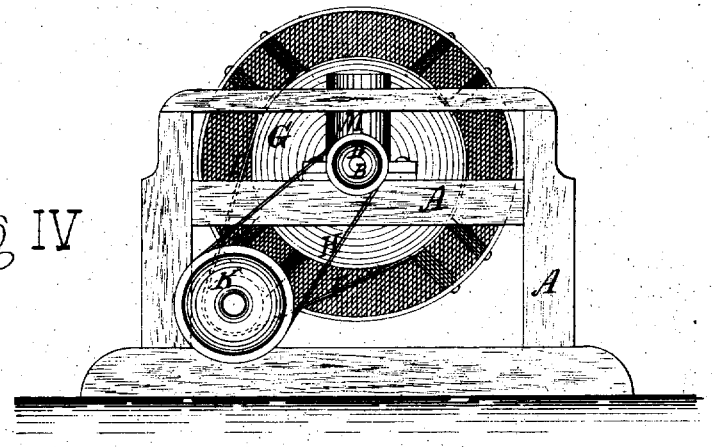
Fig III
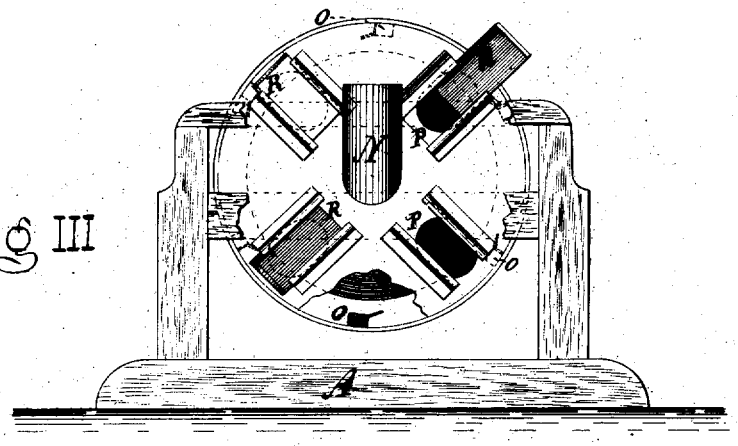
Attest
R. M. Casm
Daniel Breed
Inventor
Wilson Ager

UNITED STATES PATENT OFFICE.

WILSON AGER, OF WASHINGTON, DISTRICT OF COLUMBIA.

IMPROVEMENT IN MACHINES FOR DECORTICATING GRAIN.

Specification forming part of Letters Patent No. 92,556, dated July 13, 1869; reissue No. 3,789, dated January 11, 1870; reissue No. 4,452, dated July 4, 1871.

DIVISION B.

*To all whom it may concern:*

Be it known that I, WILSON AGER, of Washington, in the District of Columbia, have invented a new and useful Improved Machine for Decorticating Grain; and I do hereby declare that the following is a full, clear, and exact description of the same, reference being had to the annexed drawing making part of this specification, in which—

Figure I is a side elevation of the machine. Fig. II is a vertical longitudinal section thereof. Fig. III is an end elevation of the revolving screen with a portion broken away to show the elevators. Fig. IV is an end elevation of the machine.

The same letters are employed in all the figures in the designation of identical parts.

My invention relates to a machine for decorticating grain. Machines of this class differ from smut-machines and other grain-cleaning machines in this, that the latter, by a system of beaters, or other agitators, screens, and winnowers, are intended to rub off substances adhering to the pellicle, and to separate the grain from foreign substances mingled with it. All such machines are designed merely to clean the grain, and thus prepare it for use. The office of a decorticating-machine is to separate a portion of the grain itself, viz., the pellicle from the kernel. It has been proposed to accomplish this result by the aid of chemical agencies acting upon the pellicle, and also by machines which, by the abrading action of stones, emery, or roughened metallic surfaces, as well as the friction of the grains upon one another, are designed to scour or grind off the pellicle. The stones used in decorticating-machines for removing the pellicle by abrasion have plane surfaces, and are not cut or channeled, as in millstones for grinding grain. Prior to my invention, machines consisting of a revolving stone or a series of revolving stones arranged so as to wallow in the grain contained in a screen have been used for the purpose of decorticating grain. (In using the word "wallow" and its derivatives in this and other parts of this specification the meaning is intended to be limited to the description of the action of stones carried upon a horizontal or nearly horizontal shaft, and revolving through a mass of grain carried in a grain-holder extended below the stones, so that the grain shall bear against the side faces, as well as the periphery of the stone.) But machines of the kind mentioned could only be operated for a short time by reason of the friction which caused the grain to gather into cakes or lumps and the stones to gum up and to become smooth. In no prior decorticating-machine has there been any means for lifting up the grain so as to facilitate a free circulation of a current of air forced through the grain, for the purpose of cooling it and winnowing it, and repeatedly renewing its contact with the stone or other abrading-surface used. Millstones similar to those used for grinding grain, and other stones carried upon a vertical shaft, have been described in connection with currents of air for cooling the grain and surfaces for decorticating grain; but such stones would pass the grain too rapidly through them by their centrifugal action, and do not properly decorticate the grain, as in the case of a wallowing-stone, with which the same grains are brought repeatedly into contact. I believe myself to be the first person who ever combined a revolving stone, or stone arranged to wallow in grain carried in a revolving screen, with means for producing a current of air forced into the screen and through the mass of grain carried therein; and further, that no one before me ever combined with said stones, screen, and means for producing a current of air, elevators for carrying up the grain and discharging it on or between the stones, and opening the grain for the free circulation of currents of air among the grains; therefore, I do not wish such of the clauses of the statement of invention as refer, broadly, to means of producing and directing currents of air into the machine limited to the forms of the means described; neither do I wish to be limited to elevators attached to the screen, although, for convenience of construction, I prefer this means of operating the elevators. My invention consists: 1st, in combining, with a revolving stone or stones arranged to wallow in the grain, a revolving screen and mechanism for producing and forcing a current of air into said screen and through the mass of grain, for the purpose of cooling the grain and the abrading-surfaces of the machine. 2d, in combining, with a stone or stones, a grain-holder, a series of elevators, and means for producing and directing a blast or current of air into and through the machine, whereby the grain is repeatedly and alternately abraded and cooled during the operation of the machine, the grain being loosened and distributed by the elevators so as to permit the air to pass readily through to cool it and the abrading-surfaces of the machine. 3d, in combining with a revolving stone or stones, arranged to wallow in the grain, and a grain-holding screen, an air-pipe arranged to direct a blast or current of air into the screen through the end thereof, substantially as described. 4th, in combining with a revolving stone or stones arranged to wallow in the grain, and a grain-holding screen, an air-pipe or conduit arranged to direct a blast or current of air against and through the periphery of the screen from outside thereof, for the purpose of cooling the grain and machine. 5th, in combining with a revolving stone or stones, arranged to wallow in the grain, and a revolving screen, a grain-pipe or spout, arranged to feed the grain into one end of the screen, and an air-pipe or conduit arranged to direct a blast or current of air into the opposite end of the screen, whereby the air is directed toward and against the grain passing through the machine in an opposite direction. 6th, in giving a further and more perfect direction to the blast of air entering the screen at the end, by making the head and a portion of the periphery of the screen of impervious material. 7th, in combining with a revolving stone or stones, arranged to wallow in the grain, and a rotating screen, a series of adjustable discharge-apertures in the head of the screen, whereby the depth of the bed of grain in the machine may be regulated, and the passage of the grain through the machine hastened or retarded, as desired. 8th, in combining with a revolving stone or stones, arranged to wallow in the grain, and a rotating screen, provided with a series of discharge-apertures in the discharge-head, a grain-feeding pipe, which admits of a constant supply of grain into the machine, the combination being such as to admit of a constant supply and discharge of grain through the machine, equalizing the action of the stones upon the grain passing through the machine.

In the annexed drawing which represents a machine embodying my invention, A indicates the frame. Upon the frame is placed a horizontal shaft, B, carrying two stones, C, attached to said shaft at a suitable distance apart from each other, the shaft being provided with two pulleys, D and E, or, preferably, two gear-wheels. Upon the same shaft B is a screen, F, having separate journals from those of the main shaft, and a pulley or gear-wheel, G. Power is applied to the pulley or gear-wheel *e*, thus setting the shaft B, stones C, and pulley or gear-wheel D in motion—say about one hundred and eighty revolutions per minute. By means of the bands H and I, and the pulleys or gear-wheels D, K, L, and G, a slower motion is transmitted to the screen—say about thirty revolutions to the minute; or the screen may be revolved in the opposite direction to the stones, if desired. The grain is fed into the machine through the tube M and hollow shaft of the screen, as indicated by the arrow *m;* then the grain spreads over and between the stones C, being subjected to the action of their grinding-surfaces, which take off the pellicle. At the same time the elevators O, which, for convenience of construction, I have attached to the screen, carry the grain from the lower part of the screen beneath the stones to above the stones, and scatter it over and between them, thus repeatedly renewing the action of the stones upon the grain and presenting different parts of the kernels to the action of the surfaces of the stone, meanwhile exposing the grain and particles ground off in more scattered condition to the action of the blast. A constant blast of air is brought into the machine, as indicated by the arrow *u* through the pipe N, and also through a suitable conduit, directed against the exterior of the screen, as shown at X, Fig. I, or in any other suitable manner, to cool the working surfaces, and to blow out of the machine the separated pellicle and dust detached from the kernels. Fans and other means of generating blasts or currents of air passing through screens of a similar character, for other purposes, being well known, I have not considered it necessary to particularly describe them.

I prefer to introduce a great part of the blast of air into the machine through the pipe N and the hollow shaft of the screen at the opposite end from that at which the grain enters, because it is preferable in many kinds of grain to keep away the impurities from the discharge end of the screen; and, to give a proper direction to the blast of air passing in through the pipe N and hollow shaft of the screen, I have covered the discharge end of the periphery of the screen with an impervious covering, Y, of sheet metal or other suitable material, so as to direct the current of air horizontally in the screen against the grain, above and around the stones. For the same purpose, the head of the rolling screen through which the current of air is introduced, shown in Fig. 3, is made solid or of an impervious material, while the opposite end, through which the current of air passes from the machine, shown in Fig. 4, is perforated, to permit the free escape of the current of air and fine substances carried with it. Letters P represent the discharge-apertures in the discharge end or head of the screen, provided with adjustable slides R, by means of which the grain is caused to be discharged nearer to or at a greater distance from the shaft B, whereby the passage of the grain though the machine is accelerated or retarded, and, at the same time, a proper bed of grain for the action of the stones is maintained in the screen.

It will be seen that, by reason of the peculiarities of my improved machine, the grain does not require to be wet, as mentioned in the description of other former machines, which is a great advantage, as by such wetting, and the consequently required drying, the expense of separation is increased, and the quality of the grain is liable to be injuriously affected.

I do not limit my invention to the precise form of the mechanism above described, and I propose to use any number of stones that may be advantageous, according to the kind of grain to be cleaned; neither do I limit my invention to the use of a stone or stones revolving in a precisely vertical plane; but I wish to be understood that in using the term "rotating vertically" in the following claims, I wish also to include and cover stones revolving in planes slightly inclined from the vertical, but not sufficiently so as to depart from the principle of operation of my machine.

What I claim as my improvement in machines for decorticating grain, and desire to secure by Letters Patent, is—

1. In combination with a revolving stone or stones arranged to rotate vertically or nearly vertically in a bed of grain, a revolving screen and mechanism for producing and forcing a current of air into said screen and through the mass of grain, for the purpose of cooling the grain and the abrading-surfaces of the machine, substantially as set forth.

2. In combination with a revolving stone or stones, a grain-holder, a series of elevators, and means for producing and directing a blast or current of air into and through the machine, whereby the grain is repeatedly and alternately abraded and cooled, substantially as set forth.

3. In combination with a revolving stone or stones arranged to rotate vertically in a bed of grain, and a grain-holding screen, an air-pipe arranged to direct a blast or current of air into the screen through the end thereof, substantially as set forth.

4. In combination with a revolving stone or stones arranged to rotate vertically in a bed of grain, and a grain-holding screen, an air-pipe arranged to direct an induced blast or current of air against and through the periphery of the machine from outside thereof, substantially as set forth.

5. In combination with a revolving stone or stones arranged to rotate vertically in a bed of grain, and a revolving screen, a grain-pipe or spout arranged to feed the grain into one end of the screen, and an air-pipe arranged to direct a blast or current of air into the opposite end of the screen, substantially as and for the purpose described.

6. In combination with a revolving stone or stones arranged to rotate vertically in a bed of grain, a screen constructed with an impervious head and impervious portion of the periphery contiguous thereto arranged in such relation to the air-induction-pipe opening through said head that direction shall be given to the blast or current of air, substantially in the manner set forth.

7. In combination with a revolving stone or stones arranged to rotate vertically in a bed of grain, and a revolving screen, a series of adjustable discharge-apertures in a head of the screen, whereby the depth of the bed of grain may be regulated, and the passage of the grain through the machine accelerated or retarded, substantially as set forth.

8. In combination with a revolving stone or stones arranged to rotate vertically in a bed of grain, and a rotating screen provided with a series of adjustable discharge-apertures, a grain-feeding pipe which admits of a constant supply of grain into the machine, substantially as and for the purpose set forth.

In testimony whereof I have signed my name to this specification before two subscribing witnesses.

WILSON AGER.

Witnesses:
R. MASON,
DANIEL BREED.